E. BITTEL.
SALT SHAKER.
APPLICATION FILED APR. 8, 1911.
1,051,668.
Patented Jan. 28, 1913.
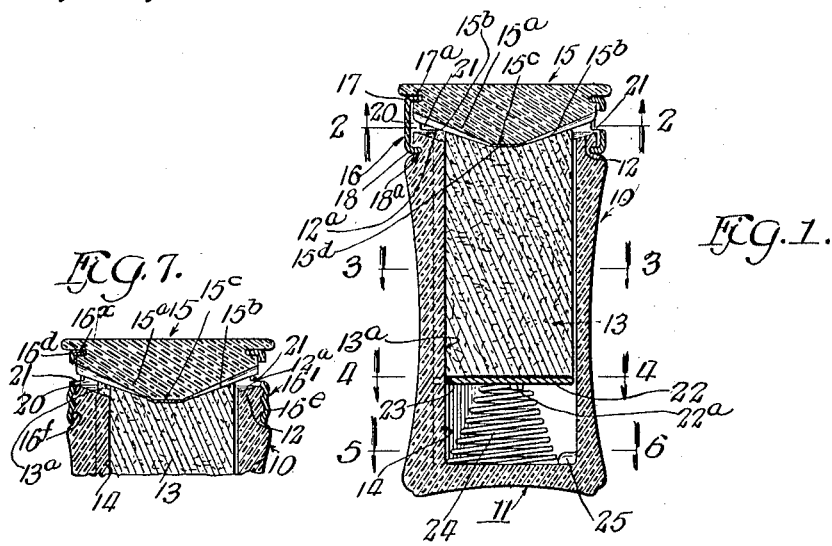
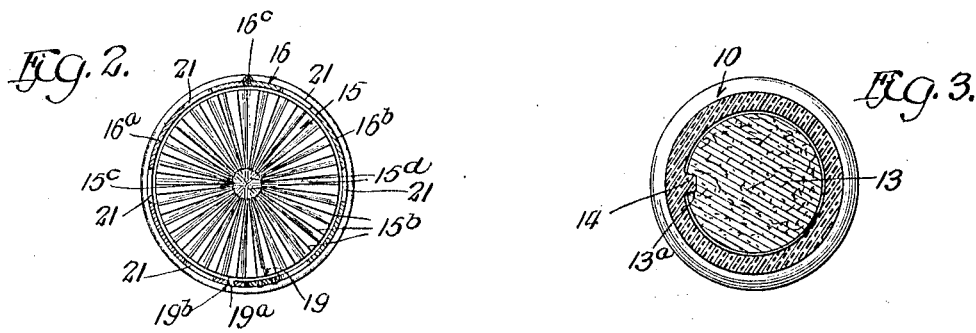
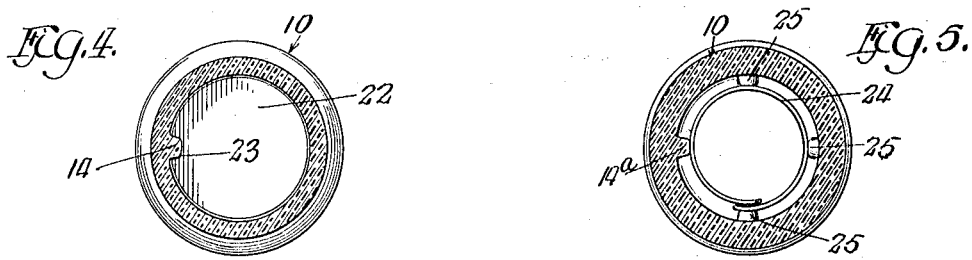
Witnesses:
Inventor.
Edward Bittel
by Poole & Brown Attys

UNITED STATES PATENT OFFICE.

EDWARD BITTEL, OF CHICAGO, ILLINOIS.

SALT-SHAKER.

1,051,668. Specification of Letters Patent. Patented Jan. 28, 1913.

Application filed April 8, 1911. Serial No. 619,739.

*To all whom it may concern:*

Be it known that I, EDWARD BITTEL, a citizen of the United States, and a resident of Chicago, in the county of Cook and State of Illinois, have invented certain new and useful Improvements in Salt-Shakers; and I do hereby declare that the following is a full, clear, and exact description thereof, reference being had to the accompanying drawings, and to the letters of reference marked thereon, which form a part of this specification.

This invention relates to an improvement in salt shakers, and consists of the matters hereinafter described and more particularly pointed out in the appended claim.

Great difficulty is had in the use of the ordinary salt shaker, particularly in damp weather, by reason of the fact that the grains of salt within the shaker stick together and form in lumps, which are too large to pass through the apertures in the cap or head of the shaker, and also for the reason that these apertures themselves become clogged up by the collection of moist salt which dries in and about said apertures, thus almost completely closing them.

The object of the present invention is to provide a salt shaker to overcome these difficulties and one in which a supply of fine dry salt may be instantly produced at any time the shaker is to be used, and in which the discharge passages for the salt are always kept fully open and clean of incrusted salt, so the salt may be easily shaken or scattered over the dish to be salted.

The advantages of my invention will appear more readily as I proceed with my specification.

In the drawings—Figure 1 is a view representing a central vertical section of a salt cellar provided with my improvements. Fig. 2 is a view representing a cross-section through the shaker in a plane indicated by the line 2—2 of Fig. 1. Fig. 3 is a view representing a cross-section through the shaker in a plane indicated by the line 3—3 of Fig. 1. Fig. 4 is a view representing a cross-section on the line 4—4 of Fig. 1. Fig. 5 is a view representing a cross-section on line 5—5 of Fig. 1. Fig. 6 is a perspective view of a flanged ring by means of which the cap or head of the salt shaker is connected to the body. Fig. 7 is a partial longitudinal central section of a shaker provided with a slightly modified form of connecting ring.

Referring now more in detail to that embodiment of my invention illustrated in the drawings—10 indicates the body of the salt shaker which is of tubular form, closed at one end to provide a bottom 11, and having its other end 12 open.

15 indicates a cap or closure for the open end 12 of the body of the shaker. Said cap is rotatively connected to the body by means of a ring 16. As shown in Figs. 1 to 6, inclusive, said ring is provided with spaced annular flanges 17, 18, each adapted for engagement with annular grooves $17^a$, $18^a$, formed respectively in the outer cylindric surfaces of the cap 15 and of the body 12. Said ring 16 comprises hinged sections $16^a$, $16^b$, pivotally connected together at one end by a hinge $16^c$, and abutting against each other at their free ends, and adapted to be held in abutting engagement by means of a spring snap 19, secured to one ring section, and having a detent $19^a$ adapted for engagement within a hole or opening $19^b$ in the other ring section. The cap 15 has its base $15^a$ in the form of a truncated cone. The end 12 of the body 10 is provided with a conical recess $12^a$, the angle of the inclination of the cone being substantially the same as that of the bottom of the cap, and the ring 16 is of such length that when the body and cap are connected together by said ring, an annular space 20 is left between the base of the cap and the end of the body. Opposite this annular space in the ring are formed spaced apertures 21 for the discharge of salt. The base of the cap is provided with a plurality of radially extending ribs $15^b$, and the flat truncated part $15^c$ of the base, which is also provided with ribs or indentations $15^d$ to roughen its surface. Said ribs, as will presently appear, are adapted for grinding or scraping fresh dry salt from a salt briquet contained in the shaker.

In the bottom of the salt shaker is located a spring controlled follower 22, which is of flat disk form and has in its periphery a notch 23 adapted for engagement with a longitudinal rib 14 projecting radially inward from the inner wall of the body. Said disk is freely movable in a direction longitudinal of the body and is engaged on its under side by a helical spring 24, which is interposed between said follower and a member made rigid with the body, in this case the bottom wall 11 of said body. Said spring tends to force said follower toward the open end 12 of the salt shaker and is preferably of a form such that it may be collapsed into the plane of its bottom member so to permit a movement of the follower, as nearly as possible, equal to the depth of the shaker. The base of said spring is held in central position on the bottom of the shaker by means of the rib 14 and lugs or shoulders 25 annularly arranged on the bottom of the shaker. The upper end of the spring 24 is connected to the follower 22 by means of a lug 22$^a$.

My improved salt shaker is particularly adapted for use with a briquet consisting of salt compressed into a solid block and having a form adapted to fit within the shaker body.

13 indicates a briquet of salt which in cross-section has substantially the same form as the cross-section of the chamber in the body. Said briquet fits loosely within the body 10 of the shaker so as to be longitudinally movable therein. The longitudinal rib 14, projecting inwardly from the body wall is adapted for engagement with a longitudinal groove 13$^a$ in the briquet body, said construction preventing the rotation of said briquet while permitting its free longitudinal movement.

The operation of the shaker is as follows: The briquet of salt 13 which, in the first instance is nearly of the same depth as the shaker, is placed in the body of the shaker with a notch 13$^a$ in engagement with the rib 14 of the body. Said briquet is pushed toward the bottom of the shaker thus compressing the spring 24, and the cap 15 is then placed with its base against the top of the briquet. The ring 16 is then clasped about the upper end of the body and about the cap with its flanges 17 and 18 in engagement within the grooves 17$^a$, 18$^a$, formed in said body and cap and is locked in place. The shaker is now ready for use. When it is desired to get salt from the shaker, the cap is rotated which causes the ribs 15$^a$, 15$^b$ to scrape or grind a little of the salt off the end of the briquet. The amount of salt ground from the briquet will of course depend upon the extent of the rotative movement of the cap. The shaker is then inclined with its top toward the plate or other receptacle in which the salt is to be placed and is shaken in the usual manner whereupon the salt falls out, passing through the grooves between the ribs 15$^b$ and thence through the apertures or openings 21 in the ring 16. The upper end of the briquet is always held in engagement with the base of the cap by the spring 24, which acts against the follower and through it causes the briquet to be fed toward the cap as the length of the briquet is decreased in the use of the salt shaker.

In Fig. 7 I have shown a slightly modified way of securing the ring to the body. In this case, the ring 16' is made integral and is provided with a flange 16$^d$ at its upper end which engages an annular groove 16$^x$ in the cap as before, but has an internal thread 16$^e$ at its lower end adapted for engagement with an external thread 16$^f$ on the upper end of the shaker.

While in describing my invention I have referred to certain details of mechanical construction and arrangement it is to be understood that my invention is not limited thereby except as may appear in the appended claim.

I claim as my invention—

A salt shaker comprising a tubular body open at one end, a spring controlled follower movable endwise of said body and provided with a notch, a longitudinal rib made rigid with the inner wall of said body and engaging within the notch of said follower, a rotative cap spaced from the end of said body and having a conical base, the end of said body being provided with a conical recess, and a ring provided with flanges engaging respectively in annular grooves formed in said body and cap, said ring comprising hinged sections and being provided with annularly arranged apertures for the passage of the salt, and means for locking said ring sections in position on said cap and body.

In testimony, that I claim the foregoing as my invention I affix my signature in the presence of two witnesses, this 3rd day of April A. D. 1911.

EDWARD BITTEL.

Witnesses:
 CLARENCE E. MEHLHOPE,
 GEORGE R. WILKINS.